(12) United States Patent
Shepherd et al.

(10) Patent No.: US 7,339,584 B1
(45) Date of Patent: Mar. 4, 2008

(54) METHOD OF GENERATING A SURFACE MESH

(75) Inventors: Jason F. Shepherd, Albuquerque, NM (US); Steven Benzley, Provo, UT (US); Benjamin T. Grover, Tracy, CA (US)

(73) Assignee: Sandia Corporation, Albuquerque, NM (US)

( * ) Notice: Subject to any disclaimer, the term of this patent is extended or adjusted under 35 U.S.C. 154(b) by 376 days.

(21) Appl. No.: 10/448,946

(22) Filed: May 29, 2003

Related U.S. Application Data (60) Provisional application No. 60/385,052, filed on May 29, 2002.

(51) Int. Cl.
*G06T 17/20* (2006.01)
*G06T 15/00* (2006.01)

(52) U.S. Cl. ...................... 345/423; 345/419
(58) Field of Classification Search ................ 345/423
See application file for complete search history.

(56) References Cited

U.S. PATENT DOCUMENTS

| 5,768,156 A * | 6/1998 | Tautges et al. ............... 716/20 |
| 6,130,673 A * | 10/2000 | Pulli et al. .................. 345/428 |
| 6,943,790 B2 * | 9/2005 | Taubin ....................... 345/420 |

OTHER PUBLICATIONS

G. Taubin (2001). Dual mesh resampling. Proceedings, Ninth Pacific Conference on Computer Graphics and Applications, p. 180-188.*
M. Muller-Hannemann, "Hexahedral Mesh Generation by Successive Dual Cycle Elimination", Engineering with Computers (1999) 15: 269-279, Springer-Verlag London Limited.*
V. Goryunov, "Vassiliev type invariants in Arnold's J+-theory of plane curves without direct self-tangencies", The University of Liverpool, Jun. 26, 1999.*
Benjamin Todd Grover, "Surface Splicing: A Method of Quadrilateral Mesh Generation and Modification for Surfaces by Dual Creation and Manipulation," M.S. thesis, Brigham Young University, Apr. 2002.
Benjamin T. Grover, Steven E. Benzley and Jason F. Shepherd, "Surface Splicing: A Dual Based Approach to Surface Mesh Modifiaction and Generation".
Nathan T. Folwell and Scott A. Mitchell, "Reliable Whisker Weaving via Curve Contraction," *Proceedings 7th International Meshing Roundtable*, pp. 365-378, 1998.
T. D. Blacker, "Analysis automation with paving: A new Quadrilateral Meshing Technique", Brigham Young University.
Benjamin T. Grover, Steven E. Benzley and Jason F. Shepherd, "Surface Splicing: A Dual Based Approach to Surface Mesh Modifiaction and Generation", 2002.
T. D. Blacker, "Analysis automation with paving: A new Quadrilateral Meshing Technique", Brigham Young University, 1990.

* cited by examiner

*Primary Examiner*—Ulka Chauhan
*Assistant Examiner*—Daniel F Hajnik
(74) *Attorney, Agent, or Firm*—Madelynne J. Farber (57) ABSTRACT

A method and machine-readable medium provide a technique to generate and modify a quadrilateral finite element surface mesh using dual creation and modification. After generating a dual of a surface (mesh), a predetermined algorithm may be followed to generate and modify a surface mesh of quadrilateral elements. The predetermined algorithm may include the steps of generating two-dimensional cell regions in dual space, determining existing nodes in primal space, generating new nodes in the dual space, and connecting nodes to form the quadrilateral elements (faces) for the generated and modifiable surface mesh.

29 Claims, 9 Drawing Sheets

Chord 3

Chord 11

METHOD OF GENERATING A SURFACE MESH

CROSS-REFERENCE

This application claims the benefit of U.S. provisional application Ser. No. 60/385,052, filed May 29, 2002.

TECHNICAL FIELD

The present invention relates generally to computer modeling of physical systems. It particularly relates to computer modeling using quadrilateral, finite element mesh generation of surfaces including dual generation and modification.

BACKGROUND OF THE INVENTION

With the advancement of computer technologies and understanding of basic physical phenomena or systems (e.g., engine operation, fluid flow, heat transfer, structural stress and strain analysis, etc.), three-dimensional (3D) computer simulation has become more of an important feature in physical system development, analysis, and evaluation. The computer simulation (modeling) often involves the building of a finite element mesh (collection of discrete set of points defined as nodes) to model the physical system. The accuracy of finite element mesh generation is related to the geometric complexity (including representing the physical system by a set of mathematical equations) of the physical system including the number of finite elements in the mesh, the order of those elements, and the quality of those finite elements.

A number of mesh-generating algorithms (e.g., parametric mapping, Dicer algorithm, Paving algorithm, Whisker-Weaving algorithm, etc.) have been developed to attempt to generate high-quality meshes with greater accuracy and reduced user interaction for generating the mesh. However, each algorithm has its own set of strengths and weaknesses, and therefore may only be suitable for a particular geometry while being ineffective for another. Therefore, there is still a need to generate high-quality meshes for all types of geometry, including quadrilateral surface meshes that are robust, accurate, and reduce user interaction time.

Figure 1A:
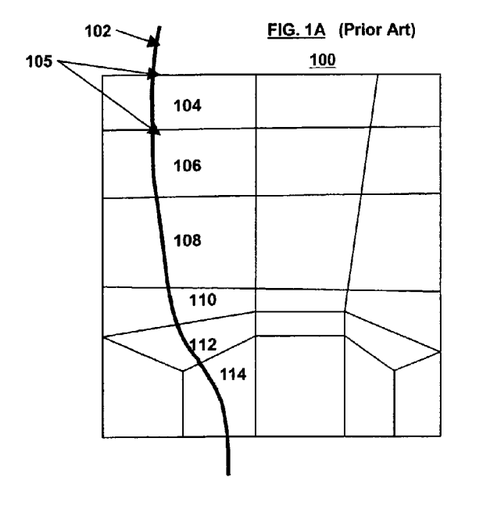
FIGS. 1A-1G are block diagrams of exemplary dual generation found in the prior art.
Figure 1B:
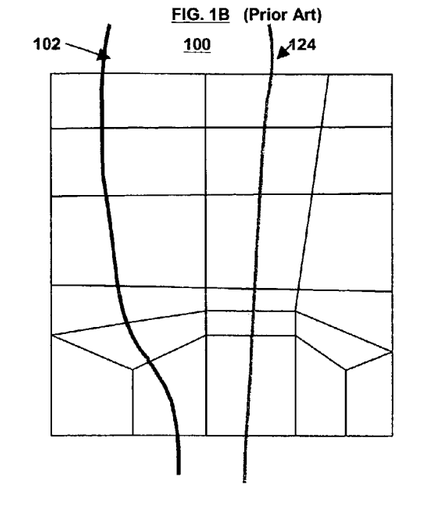
Figure 1C:
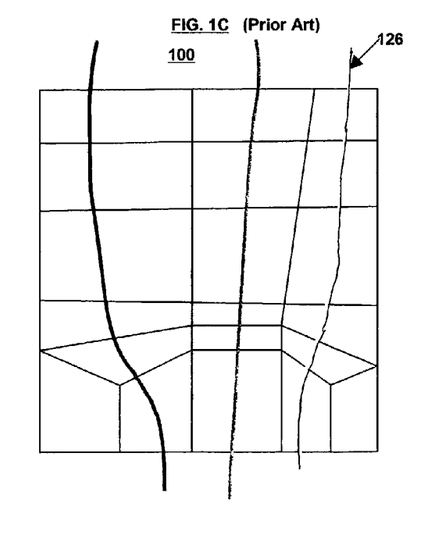
Figure 1D:
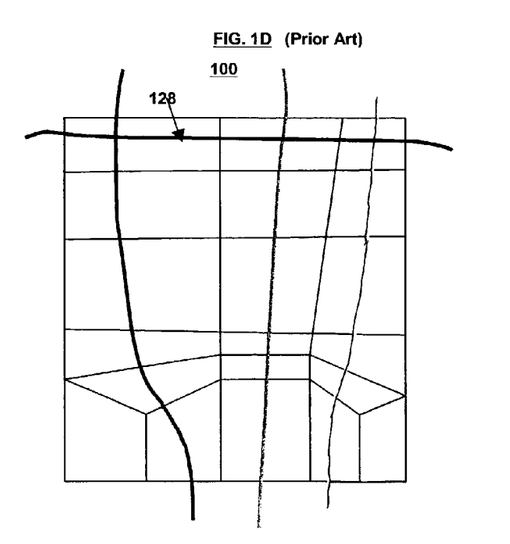
Figure 1E:
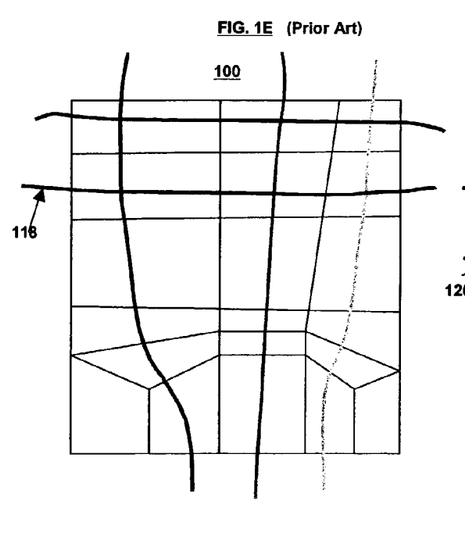
Figure 1F:
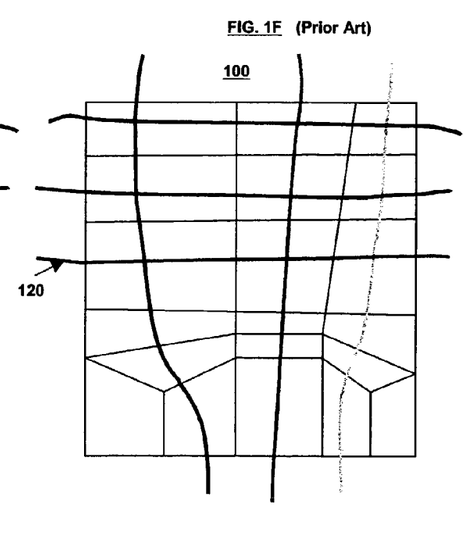
Figure 1G:
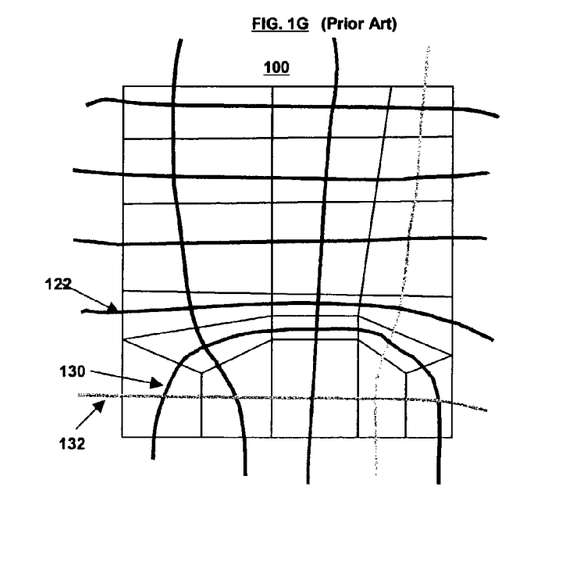

As described herein, the generation of a dual (for a surface) within a dual space may be an effective tool for producing a high-quality mesh for quadrilateral surfaces. It is noted that terms used within the specification, in accordance with embodiments of the present invention, will be defined within the specification and further definition may be found within the Glossary of Terms in Appendix A. FIGS. 1A-1G illustrate the process for generating a dual of a surface as found in the prior art. FIG. 1*a* shows a portion 100 of a surface (mesh) in primal space. It is noted that portion 100 may also be the complete mesh. A dual of the surface is generated by connecting opposite edges of a quadrilateral element using a chord 102 (see Appendix A for glossary of terms) as shown. As shown in FIG. 1A, chord 102 (a dual chord) connects the opposite edges for a vertical row of quadrilateral elements 104, 106, 108, 110, 112, 114, and chord 102 may be composed of individual, connect chord segments such as chord segment 105 connecting opposite edges of quadrilateral element 104. Also, as shown in FIG. 1*a*, individual chords used in generating the dual of the surface may each be given a unique identification number (e.g., chord 102 labeled as "1"). In the dual space generated, chord 102 is equivalent (the dual) to the row of quadrilateral elements 104, 106, 108, 110, 112, 114 in the primal space.

The generation of the dual continues as shown in FIGS. 1B-1G as the opposite edges of more rows of quadrilateral elements are connected using further chords (e.g., 118, 120, 122, 124, 126, 128, 130, 132) until a dual for the entire portion of the surface 100 (composed of the intersecting chords) has been completed. The dual is generated with adherence to the following rules: 1) chords may not be tangent, 2) two chords may only intersect in the interior of a quadrilateral element, and 3) only two chords may intersect at any given point.

Figure 2:
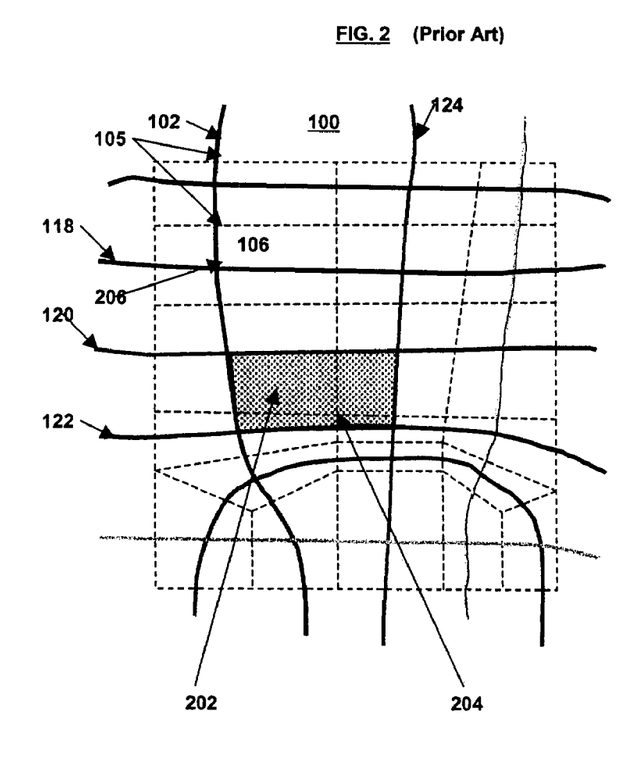
FIG. 2 is a block diagram of an exemplary dual of a surface showing two-dimensional cell regions found in the prior art.

As shown in FIG. 2 from the prior art, other elements are created from the generation of the dual of surface portion 100. A two-dimensional (2D) cell region 202 may be generated, as shown in FIG. 2, that is defined as an n-sided polygon with the sides composed of individual chord segments from chords 102, 120, 122, 124 (see glossary in Appendix A). Also, every cell region includes a single node (e.g., node 204) from the original surface portion 100. Cell region 202 is equivalent (the dual) to node 204 within the dual space generated. Also, a centroid 206 may be generated that is defined as the intersection of two chords 102, 118 in the dual space where every intersection of chords (e.g., 102, 118) in the dual space includes one quadrilateral element (e.g., 106) in the original surface 100 (see glossary in Appendix A). Centroid 206 is equivalent (the dual) to quadrilateral element 106 within the dual space generated. Also, Table A in Appendix B shows the relationship between the original surface elements and dual entities in two dimensions.

Therefore, due to the disadvantages of current meshing algorithms, there is a need to provide a computer modeling technique that uses duals to generate and modify quadrilateral surface meshes while maintaining accuracy, reduced user interaction time, and high quality of the resulting meshes.

SUMMARY OF THE INVENTION

The method and machine-readable medium of the present invention overcome the previously mentioned problems by providing a technique to generate and modify a quadrilateral finite element surface mesh using dual creation and modification. After generating a dual of a surface (mesh), a predetermined algorithm may be followed to generate and modify a surface mesh of quadrilateral elements. The predetermined algorithm may include the steps of generating two-dimensional (2D) cell regions in dual space, determining existing nodes in primal space, generating new nodes in the dual space, and connecting nodes to form the quadrilateral elements (faces) for the generated and modifiable surface mesh.

DETAILED DESCRIPTION

Figure 3:
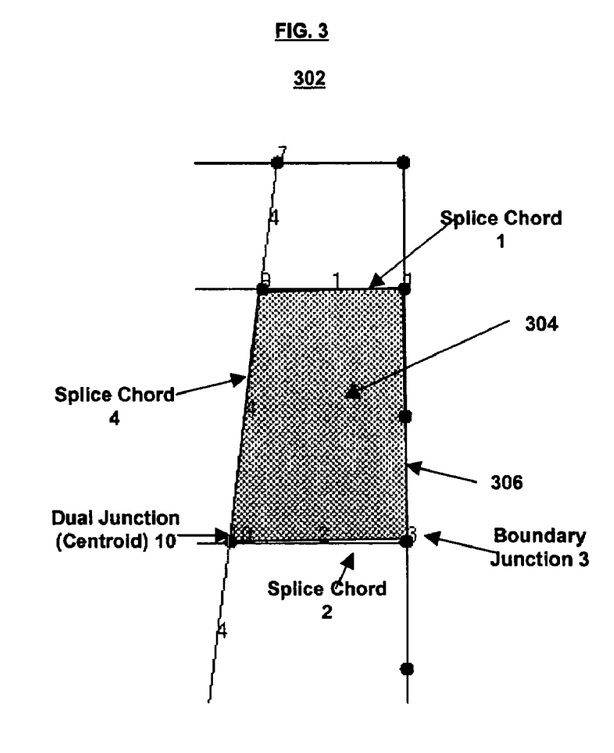
FIG. 3 is a block diagram showing exemplary elements of a surface splicing algorithm in accordance with embodiments of the present invention.

In accordance with embodiments of the present invention, a surface splicing algorithm may be followed (as executed by a machine-readable medium) to generate a finite element surface mesh using a dual of a surface (e.g., a brick surface). FIG. 3 shows a block diagram including exemplary elements of a surface splicing algorithm in accordance with embodiments of the present invention. The surface may include a plurality of two-dimensional faces where each face has four edges and at least four predetermined nodes. As shown in FIG. 3, a dual 302 of a surface may be generated (following the steps of FIG. 1) including a plurality of elements. The dual 302 may include a plurality of (splice) chord segments (e.g., 1, 2, 4) used to generate the dual. A two-dimensional (2D) cell region 304 may be generated for every closed loop of intersecting splice chord segments (e.g., 1, 2, 4). Every splice chord segment (e.g., 2) may include a dual junction 10 as a point on the splice chord. The dual junction point 10 may be an intersection of two splice chords (e.g., 2, 4) or a control point on the splice chord. A dual junction with four intersecting (adjoining) splice chord segments (or two intersecting chords) may be defined as a centroid (e.g., 10). A dual junction may be either an interior junction (e.g., 10) found in the interior of the dual or a boundary junction (e.g., 3) found on the boundary of the dual 302. An outer edge 306 of the dual may be defined as a geometric boundary of the dual. Each splice chord segment (e.g., 1, 2, 4) may be uniquely identified as shown in FIG. 3.

Figure 4:
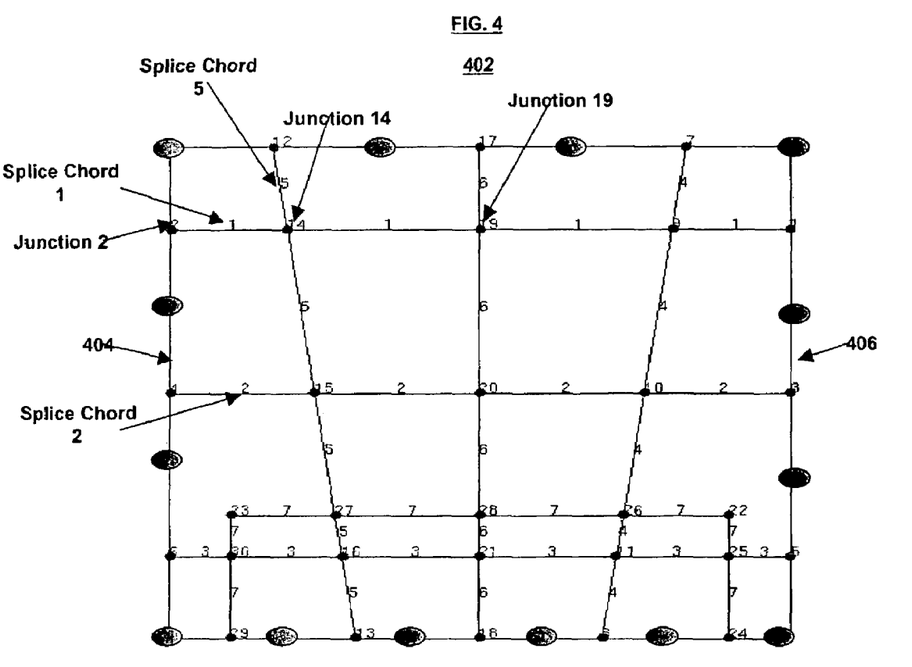
FIG. 4 is a block diagram of an exemplary generated dual of a surface in accordance with embodiments of the present invention.
Figure 5:
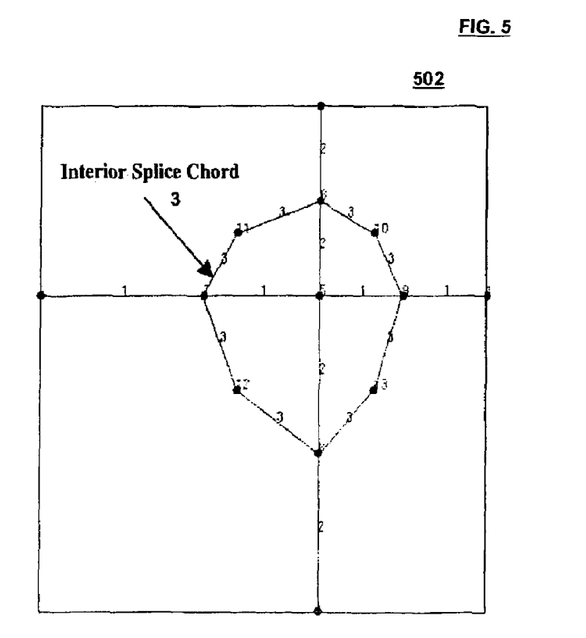
FIG. 5 is a block diagram of an exemplary generated dual of a surface showing an interior splice chord in accordance with embodiments of the present invention.
Figure 13:
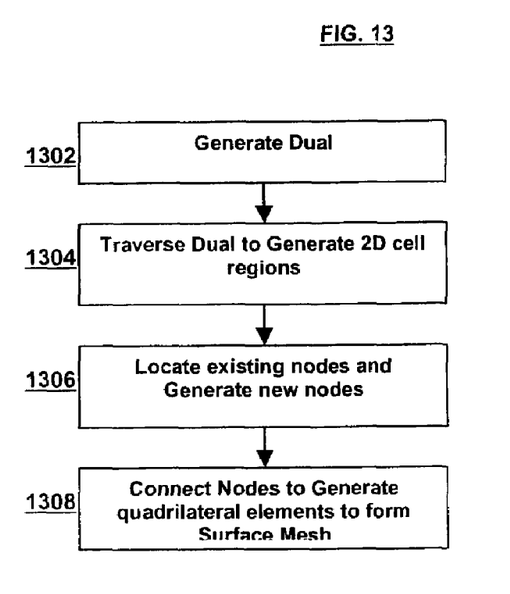
FIG. 13 is a flow process diagram of a surface splicing algorithm in accordance with embodiments of the present invention.

FIG. 13 is a flow process diagram of a surface splicing algorithm in accordance with embodiments of the present invention. At step 1302, a dual 402 of a surface may be generated as shown in FIG. 4. The generated dual 402 may be generated using a splice chord (e.g., 5) which may be created using different techniques. The different methods of creating the splice chord include, but are not limited to, connecting two edges (e.g., 404, 406 connected by splice chord 2) on the same surface, connecting a series of junctions (e.g., 2, 14, 19, etc.) together, and automatic generation of the splice chord. A generated chord (e.g., 2) may start and terminate at two unique edges (e.g., 404, 406), advantageously meshed, of the surface faces, or start and terminate at the same junction as shown in FIG. 5 for dual 502 using splice chord 3. Each chord may be uniquely identified (e.g., 1, 2, ... ). As chords (e.g., 1, 5) cross, junctions (e.g., 14) may be automatically created, and a chord (e.g., 1) may be broken into segments between each junction (e.g., 2, 14, 19). Each junction may be formed from up to four connecting chord segments, and the chord segments may be stored in an array in a counter-clockwise manner.

Figure 6:
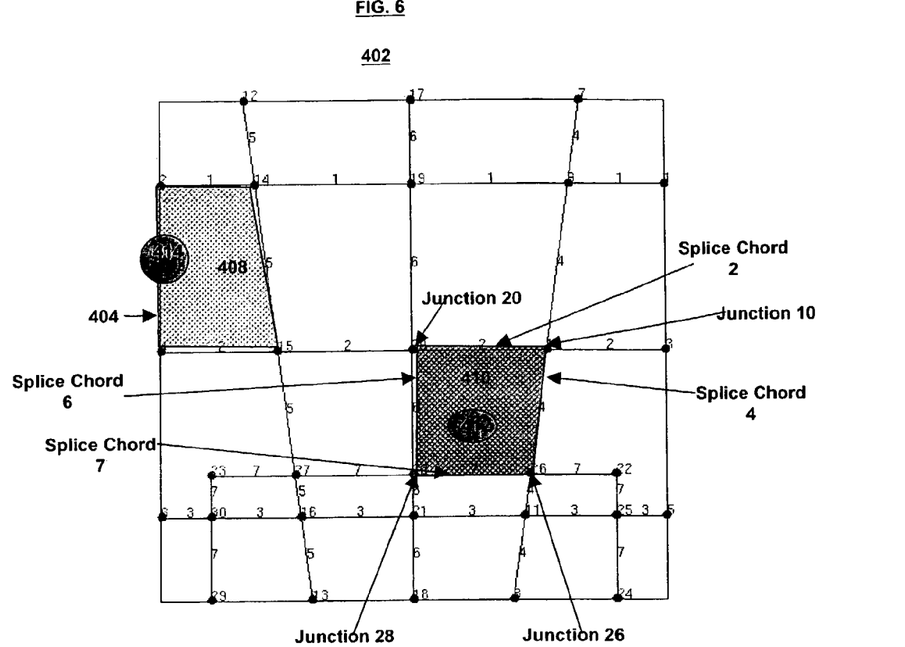
FIG. 6 is a block diagram of an exemplary generated dual of a surface showing two-dimensional cell regions in accordance with embodiments of the present invention.

After the dual (mesh) 402 has been generated, at step 1304 the dual 402 may be traversed to generate individual 2-dimensional (2D) cell regions (e.g., 408, 410) as shown in FIG. 6. The cell regions (e.g., 408, 410) are the n-sided polygons that are generated from the chords of the dual 402. The cell region may be a boundary cell region 408 located on the boundary of the dual 402, or an interior cell region 410 located in the interior of the dual 402.

Cell region 410 may be used as a guide for generating the 2D cell regions for the rest of dual 402. Firstly, an interior junction (e.g., junction 28) may be located. Secondly, traversing the sides of the polygon shape 410, a pair of adjacent chord segments 6, 7 on junction 28 may be located. Thirdly, the adjacent segment 6 may be used to find the junction 20 opposite of junction 28. Fourthly, at junction 20 the chord segment 2 adjacent to segment 6 may be located. Following this step, the third and fourth steps may be repeated until the polygon 410 closes, or an edge or a segment (e.g., 6) is reached that has already been used twice to generate the cell region 410. Following this step, a node (e.g., 412) may be generated at the center of an interior 2D cell region (e.g., 410), or associate an already existing node (e.g., 414) on the edge (e.g., 404) for a boundary 2D cell region 408 as shown in FIG. 6.

As shown in FIG. 6, when a polygon (e.g., 410) closes, a new 2D cell region has been generated, and the chord segments forming the new cell region may be marked as being used once to prevent a segment from being used in more than two 2D cell regions. When a segment has been used two times or the polygon does not close, then the algorithm may proceed to the next segment pair (e.g., 4, 7) on the junction (e.g., 26), as the number of segment pairs is equivalent to the number of segments (e.g., four segments may create four segment pairs).

Figure 7:
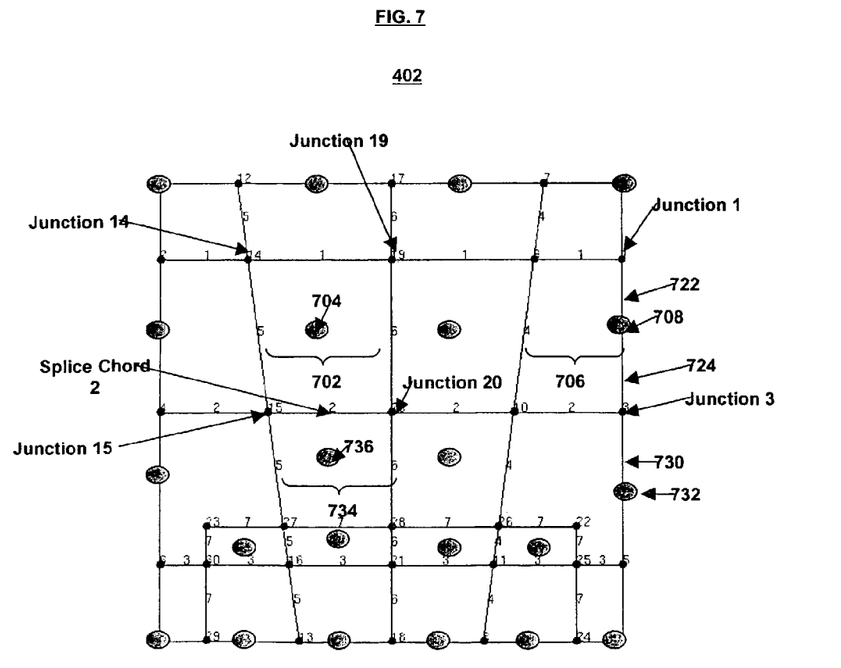
FIG. 7 is a block diagram of an exemplary generated dual of a surface showing existing and new nodes in accordance with embodiments of the present invention.

After the 2D cell regions have been generated for dual 402, at step 1306 existing nodes of the surface may be located and new nodes may be generated. As shown in FIG. 7, each generated interior 2D cell region (e.g., 702) generates a new node (e.g., 704), and each generated boundary 2D cell region (e.g., 706) includes an existing (predetermined) node (e.g., 708). Advantageously, for an interior cell region (e.g., 702), the new node 704 may be generated at the average of all the coordinates of the junctions (e.g., 14, 19, 15, 20) of the 2D cell region 702.

As shown in FIG. 7, boundary cell region 706 includes two boundary junctions 1, 3 that are located on a geometric boundary (curve) of the surface. Boundary junctions 1, 3 may sit on adjacent edges 722, 724, sharing a common node 708, of the quadrilateral element of the surface formed by edges 722, 724. The common node 708 is associated with the boundary cell region 706 as an existing node of the quadrilateral element formed by edges 722, 724. Advantageously, each generated 2D cell region, whether interior or boundary, may be permanently associated with its node (each node having a unique identification) to help generate element faces in the next step of the surface splicing algorithm.

Figure 8:
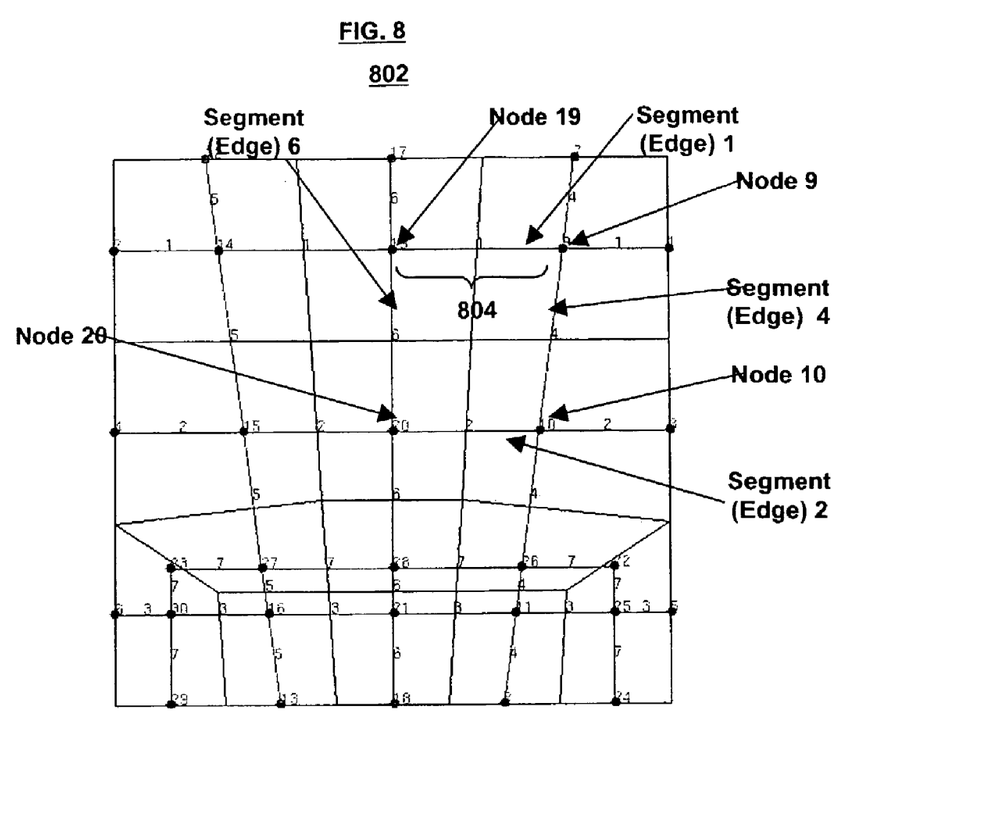
FIG. 8 is a block diagram of an exemplary generated surface mesh from a generated dual showing quadrilateral faces in accordance with embodiments of the present invention.

After generation of the new and existing nodes for the dual 402, at step 1308 the nodes may be connected to generate quadrilateral elements (faces) for the creation of a surface mesh 802 as shown in FIG. 8. Before generating the faces and to correctly connect nodes, data may be collected on the relationship between each splice chord segment of the dual 402 and the existing and newly created nodes. As shown in FIG. 7, boundary segment 2 (a chord segment connected to geometric edges 724, 730 of the surface) from dual 402 may be associated with two nodes 708, 732 on the connecting geometric edges 724, 730.

To find the associated nodes for an interior segment (e.g., segment 2 between junctions 15, 20), firstly the two 2D cell regions 702, 734 using the interior segment 2 may be located. Secondly, the node (704, 736) associated with each 2D cell region may be located. Thirdly, the two nodes 704, 736 (from each 2D cell region 702, 734) may be associated with the interior segment 2. Upon completion of these steps, every segment, whether interior or boundary, has been associated with two nodes allowing the generation of the quadrilateral faces.

To generate the quadrilateral faces (elements), the segments connecting into each junction are used as every junction has a group of associated counter-clockwise (CCW) segments, and each generated face may have its nodes and edges in CCW order for proper generation. FIG. 8 illustrates a generated quadrilateral element 804 having its nodes and edges stored in CCW order as edge 4 (and associated nodes 19 and 20) are stored in a CCW order. For proper quadrilateral element generation, four nodes (e.g., 9, 10, 19, 20) may be used to generate the element 804. Additionally, when a junction has four associated chord segments, the junction may have eight nodes (two for each associated segment) which provide necessary duplication for proper node connectivity to generate the quadrilateral faces.

To complete generation of the new quadrilateral faces, firstly two adjacent segments (e.g., segments 4, 1) on a junction (junction 9) are located. Secondly, the two nodes associated with each segment (nodes 19, 20 for segment 4; nodes 10, 20 for segment 1) are located. Thirdly, of the four nodes (two from each segment) located, the common node (node 20) is determined which becomes the middle of three nodes (19, 20, 10) for the quadrilateral element (e.g., 804). Fourthly, the next segment (segment 6) is located and the one node (node 9) associated with segment 6 that is not associated with segment 1 is determined. Thereafter, the quadrilateral face (element) may be generated by connecting the four nodes (19, 20, 10, 9) as shown in FIG. 8. Advantageously, since a centroid is equivalent to a quadrilateral element within the dual space generated, the proper number of quadrilateral faces may be generated for the new surface mesh 802 shown in FIG. 8. In accordance with the algorithm, as 2D cell regions are generated as shown in FIG. 6 by traversing the junctions of the dual space, at the same time the proper number of new quadrilateral faces may be generated by traversing each junction once.

Figure 9:
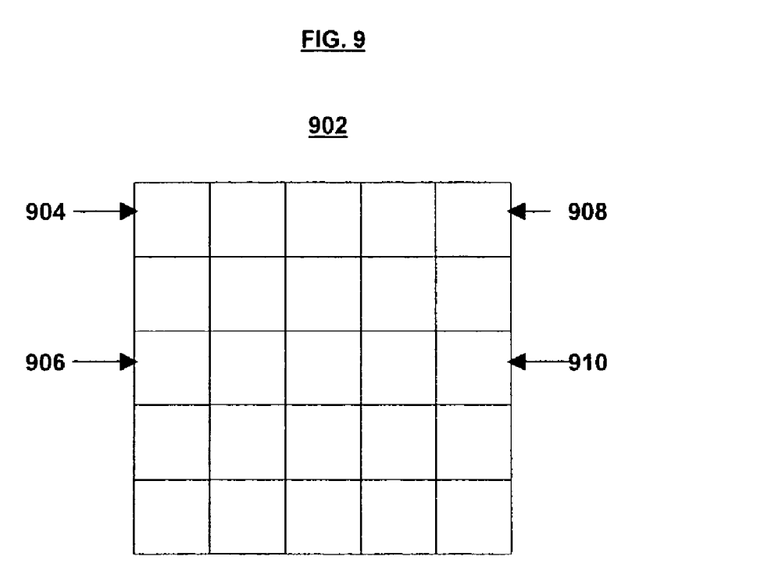
FIG. 9 is a block diagram of an exemplary existing surface mesh in accordance with embodiments of the present invention.
Figure 10:
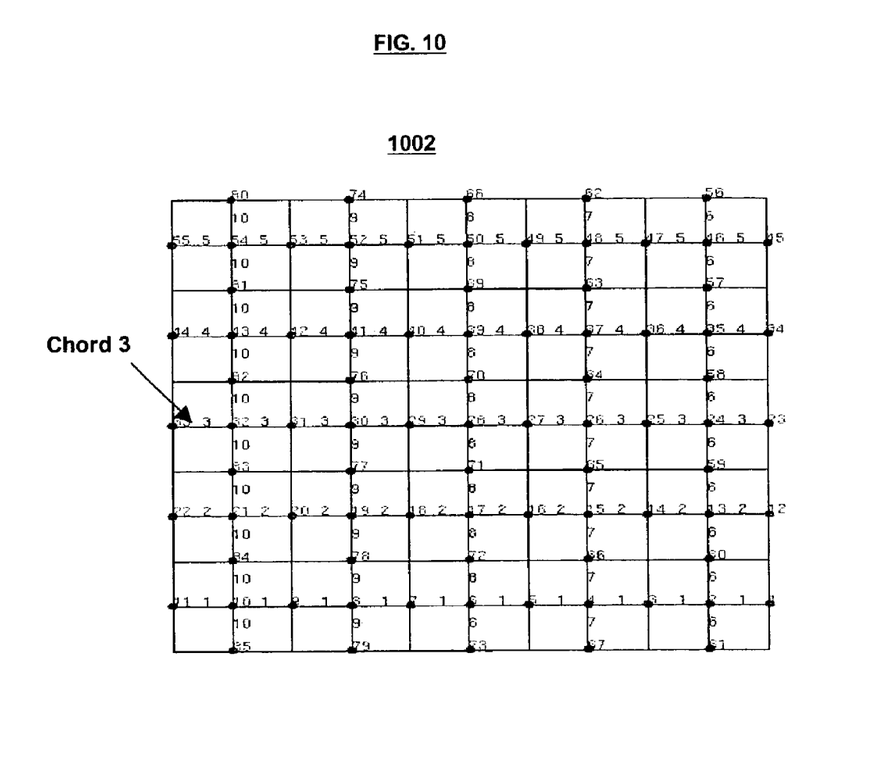
FIG. 10 is a block diagram of an exemplary generated dual of a surface mesh in accordance with embodiments of the present invention.
Figure 14:
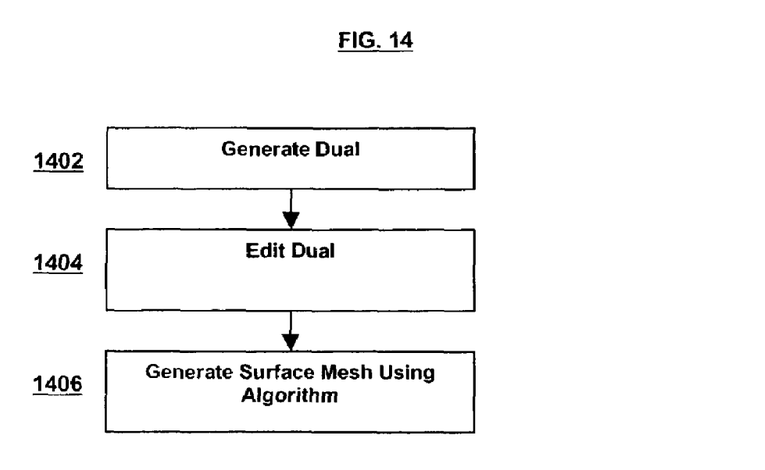
FIG. 14 is a flow process diagram for editing an existing surface mesh in accordance with embodiments of the present invention.

In accordance with embodiments of the present invention, the surface splicing algorithm (as executed by a machine-readable medium) may also be used to edit (modify) an existing surface mesh. FIG. 14 is a flow process diagram for editing an existing surface mesh in accordance with embodiments of the present invention. At step 1402, a dual of a surface mesh 902 (shown in FIG. 9) may be generated. To generate the dual, firstly all boundary edges (e.g., 904, 906, 908, 910, etc.) of the surface mesh 902 may be located. Secondly, a first boundary edge may be located, and then traverse across opposite edges until another boundary edge is reached. Thirdly, as each opposite edge pair is located, three junctions may be generated, one in the center of the face (formed by an edge pair) and one on each edge. Splice chord segments may be generated between each of the junctions. Fourthly, both boundary edges may be marked as being traversed. Next, any edges on the surface mesh that have not been traversed may be located, and then start on one of the non-traversed edges and continue until the start edge is reached again (generating junctions and connecting the junctions with splice chord segments). Following these steps, a dual 1002 of the surface mesh 902 is completed as shown in FIG. 10. The dual 1002 may include uniquely identified chords (e.g., 1, 2, 3, 4, 5, etc.).

Figure 11:
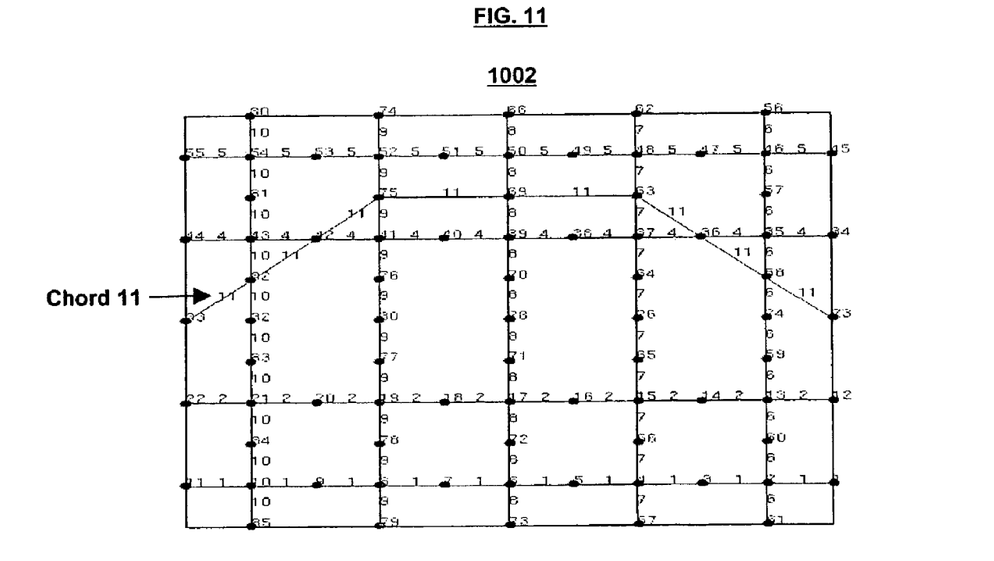
FIG. 11 is a block diagram of an exemplary generated dual of a surface mesh showing existing and new chords in accordance with embodiments of the present invention.
Figure 12:
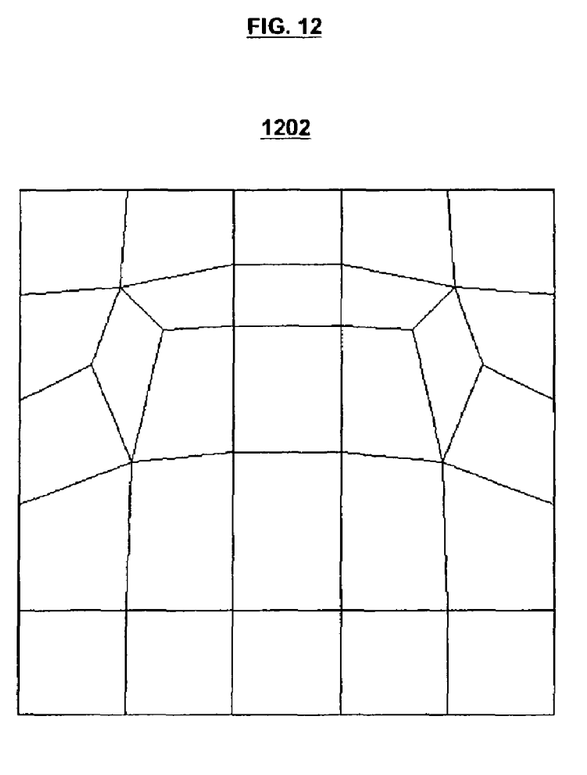
FIG. 12 is a block diagram of an exemplary modified surface mesh from a generated dual in accordance with embodiments of the present invention.

After the dual has been generated, at step 1404 editing of the dual may be performed as new chords may be created and existing chords deleted. As shown in FIGS. 10, 11, existing chord 3 may be deleted and new chord 11 introduced for the dual 1002. After the editing has been completed, at step 1406 a new surface mesh 1202 may be generated (recreated) as shown in FIG. 12 using the surface splicing algorithm as described herein to traverse the dual to generate 2D cell regions, find existing nodes and create new nodes, and connect nodes together generating quadrilateral faces (elements) for new surface mesh 1202.

Figure 15:
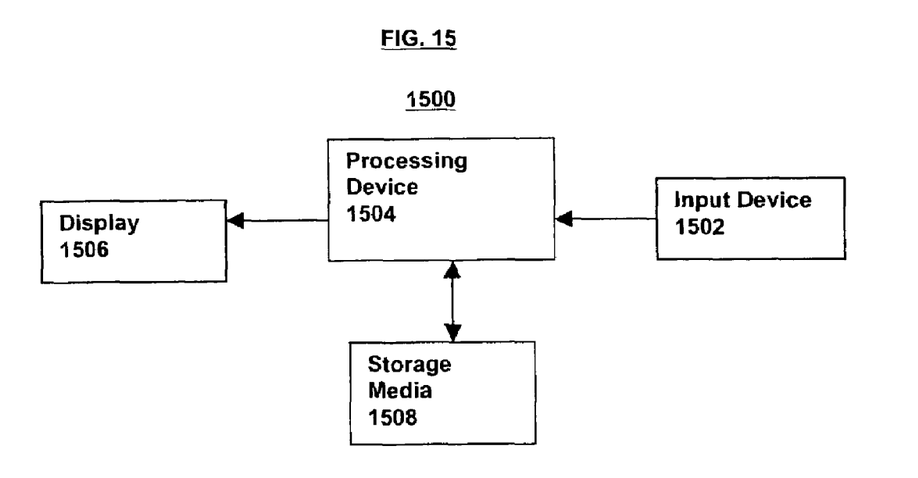
FIG. 15 is a block diagram of an exemplary system performing mesh generation and modification in accordance with embodiments of the present invention.

As described herein, the surface splicing algorithm and surface mesh editing may be performed by a computer system using a machine-readable medium. FIG. 15 is a block diagram of an exemplary system performing dual generation in accordance with embodiments of the present invention. System 1500 includes an input device 1502, processing device 1504, display 1506, and storage media 1508. Advantageously, processing device 1504 may automatically execute the surface splicing algorithm and/or surface mesh editing technique (shown in FIGS. 13, 14) by retrieving a surface design (mesh) from storage media 1508, and display the resulting mesh on display 1506. Alternatively, one or more of the individual steps of the surface splicing algorithm and/or surface mesh editing may be performed in response to commands received via input device 1502.

A plurality of advantages may be provided in accordance with embodiments of the present invention including an existing surface mesh editing method that allows elements (e.g., chords) to be modified without regard to neighboring elements enabling independent editing of surface mesh elements. Additionally a surface mesh generation and modification algorithm has been provided that generates a high-quality resulting mesh by recognizing global connectivity information (e.g., local self-intersections and self-tangencies of dual chords) regarding the mesh.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

Appendix A

Glossary of Terms

Chord: A chord is a collection of one or more chord segments. It is the dual of a row of quadrilateral elements in a surface (mesh). A chord can start at an edge and terminate at another edge (i.e. a chord with two end points), or it can loop back and close on itself (i.e. a chord with no endpoints). A chord must contain at least one chord segment.

Chord Segment: A splice chord segment is a piece on a splice chord that is between two junctions. A group of ordered segments defines a splice chord.

2-Cells: A closed loop of splice chord segments that create an n-sided polygon in dual space. The 2-cell is the lowest level closed loop in dual space. The 2-cell is dual to a node, meaning one two cell exists for every node on the surface mesh.

Dual Junction: A dual junction is a point on a splice chord. It can be either an intersection of two splice chords or a control point on a splice chord. A dual junction can have either two splice chord segments joining into it or four splice chords segments joining into it. A junction that is a centroid has four adjoining splice chord segments. A junction may not define a centroid, but is defined by an intersection of two or four splice chord segments. A dual junction may be in the interior of a surface or on a boundary. A dual junction with four connecting chord segments, i.e. a centroid, is dual to a quadrilateral face on the surface mesh.

Centroid: a centroid is the intersection of two chords. For every intersection of chords in the dual, there exists one quadrilateral element in the surface (mesh). A centroid is the dual of a quadrilateral element.

Appendix B

TABLE A

| Mesh Entity | Dimension | Dual Entity | Dimension |
|---|---|---|---|
| Face | 2 | Centroid | 0 |
| Edge | 1 | Chord | 1 |
| Node | 0 | 2-cell | 2 |

What is claimed is:

1. A method, practiced on a computer, for generating a surface mesh, comprising:
    generating a two-dimensional (2D) dual of a surface, where said surface includes a plurality of two-dimensional (2D) faces each having four edges and at least four predetermined nodes;
    generating a plurality of two-dimensional (2D) cell regions, each associated with a new node, from traversing said 2D dual;
    connecting said new nodes to form quadrilateral elements which form a surface mesh; and
    displaying said surface mesh on a computer screen.

2. The method of claim 1, wherein said generating a 2D dual includes:
    a. generating a first chord segment from one edge to an opposing edge of a first 2D face of said surface, wherein the first chord segment passes through the interior of the first 2D face;
    b. generating a second chord segment from the opposing edge of the first 2D face to another opposing edge of a second 2D face, wherein the second chord segment passes through the interior of the second 2D face;
    c. connecting the first chord segment to the second chord segment to form a first splice chord;
    d. repeating steps a) through c) until there are no more opposing edges to connect for the first splice chord;
    e. repeating steps a) through d) for a second splice chord until there are no more opposing edges to connect for the second splice chord; and
    f. repeating steps a) through e) until two splice chords intersect at the face of every quadrilateral element in the surface mesh.

3. The method of claim 2, wherein each splice chord starts and terminates at two unique edges.

4. The method of claim 2, wherein the first chord segment connects to the second chord segment at a first junction.

5. The method of claim 4, wherein each splice chord starts and terminates at the same junction.

6. The method of claim 1, wherein said generating a 2D dual includes:
    a. generating a first chord segment from a first junction to an adjacent junction of a first 2D face;
    b. generating a second chord segment from the adjacent junction of the first 2D face to another adjacent junction;
    c. connecting the first chord segment to the second chord segment to form a first splice chord;
    d. repeating steps a) through c) until there are no more adjacent junctions to connect for the first splice chord;
    e. repeating steps a) through d) for a second splice chord until there are no more adjacent junctions to connect for the second splice chord; and
    f. repeating steps a) through e) until two splice chords intersect at the face of every quadrilateral element in the surface mesh.

7. The method of claim 6, wherein each splice chord starts and terminates at the same junction.

8. The method of claim 1, wherein generating a 2D dual includes:
    a. generating a plurality of rows of connecting chord segments from one edge to an opposing edge of a plurality of 2D faces of said surface, wherein chord segments connect at junctions;
    b. generating a plurality of splice chords by connecting edges of said faces to junctions of said chord segments; and
    c. repeating step b) until two splice chords intersect at the face of every quadrilateral element in the surface mesh.

9. The method of claim 1, wherein generating a plurality of 2D cell regions includes:
    a. finding an interior junction;
    b. finding two segments adjacent to the interior junction, wherein the two segments comprise an initial segment and a subsequent segment;
    c. finding a junction opposite the interior junction, wherein the junction opposite is adjacent to the subsequent segment;
    d. finding a segment adjacent to the subsequent segment, wherein the segment adjacent is adjacent to the junction opposite; and
    e. repeating steps c) and d) until a predetermined completion threshold has been satisfied.

10. The method of claim 9, wherein said predetermined completion threshold includes one of:
    the initial segment, subsequent segment, and all segments adjacent forming a polygon;
    an edge is reached; and the initial segment, subsequent segment, or segment adjacent has been used twice to generate a 2D cell region.

11. The method of claim 1, wherein generating a plurality of 2D cell regions includes:
placing said new node substantially near the center of an interior 2D cell region for every interior 2D cell region; and
locating said predetermined node, located on the edge, for every boundary 2D cell region.

12. The method of claim 11, wherein placing includes averaging all the coordinates of junctions of the 2D cell region.

13. The method of claim 11, wherein locating includes:
finding two boundary junctions for the boundary 2D cell region;
finding an edge for each of the two boundary junctions;
finding a shared common node for the two edges; and
associating the shared common node with the 2D cell region.

14. The method of claim 1, wherein connecting includes:
storing data about a plurality of segments used to form said plurality of 2D cell regions;
associating at least one new or predetermined node with each segment; and
connecting nodes to form quadrilateral faces.

15. The method of claim 14, wherein associating includes:
finding a segment connected to a geometric edge; and
associating the segment with two nodes on the geometric edge.

16. The method of claim 14, wherein associating includes:
finding an interior segment;
finding two 2D cell regions that use the interior segment;
finding a node associated with each 2D cell region; and
associating the two nodes with the interior segment.

17. A method, practiced on a computer, for generating a surface mesh, comprising:
generating a two-dimensional (2D) dual of a surface, where said surface includes a plurality of two-dimensional (2D) faces each having four edges and at least four predetermined nodes;
generating a plurality of two-dimensional (2D) cell regions, each associated with a new node, from traversing said 2D dual;
connecting said new nodes to form quadrilateral elements which form a surface mesh, wherein said connecting includes:
storing data about a plurality of segments used to form said plurality of 2D cell regions;
associating at least one new or predetermined node with each segment; and
connecting nodes to form quadrilateral faces, wherein connecting nodes includes:
locating two adjacent segments on a junction formed by intersecting segments, wherein one adjacent segment is counterclockwise to the other adjacent segment;
identifying two nodes associated with each of the two adjacent segments;
finding a common node of the four nodes identified;
identifying the common node as the middle node;
moving to the counterclockwise adjacent segment;
obtaining a next segment, wherein the next segment is counterclockwise to the counterclockwise adjacent segment;
finding a node on the next segment that is not also on the counterclockwise adjacent segment;
generating said quadrilateral face using the two nodes, the middle node, and the node on the next segment; and
associating the junction with the face, wherein the face is a quadrilateral element; and
displaying said surface mesh on a computer screen.

18. A method, practiced on a computer, for modifying a surface mesh, comprising:
generating a two-dimensional (2D) dual of a surface mesh, wherein said surface includes a plurality of two-dimensional (2D) faces each having four edges and at least four predetermined nodes;
editing the 2D dual;
generating a plurality of two-dimensional (2D) cell regions, each associated with a new node, from traversing said 2D dual;
connecting said new nodes to form quadrilateral elements which form a modified surface mesh; and
displaying said surface mesh on a computer screen.

19. The method of claim 18, wherein editing includes removing self-intersections in said surface mesh.

20. The method of claim 18, wherein editing includes removing self-tangencies in said surface mesh.

21. The method of claim 18, wherein editing the 2D dual includes editing the surface mesh.

22. A method, practiced on a computer, for editing a portion of a surface mesh, comprising:
selecting a portion of a surface mesh for editing, where the mesh includes a plurality two-dimensional (2D) faces each having four edges and at least four predetermined nodes;
generating a two-dimensional (2D) dual of the portion of the surface mesh;
editing the 2D dual;
generating a plurality of two-dimensional (2D) cell regions, each associated with a new node, from traversing said 2D dual;
connecting said new nodes to form quadrilateral elements which form a modified surface mesh; and
displaying said modified surface mesh on a computer screen.

23. The method of claim 22, wherein editing includes removing self-intersections in said portion of the surface mesh.

24. The method of claim 22, wherein editing includes removing self-tangencies in said portion of the surface mesh.

25. The method of claim 22, wherein editing the 2D dual includes editing the surface mesh.

26. A quadrilateral mesh generator for generating a surface mesh, comprising:
a controller for performing the steps of:
generating a two-dimensional (2D) dual of a surface, where said surface includes a plurality of two-dimensional (2D) faces each having four edges and at least four predetermined nodes;
generating a plurality of two-dimensional (2D) cell regions, each associated with a new node, from traversing said 2D dual;
connecting said new nodes to form quadrilateral elements which form a surface mesh; and
displaying said surface mesh on a computer screen.

27. A mesh modifier for modifying a surface mesh, comprising:
a controller for performing the steps of:
generating a two-dimensional (2D) dual of a surface mesh, wherein said surface includes a plurality of two-dimensional (2D) faces each having four edges and at least four predetermined nodes;

editing the 2D dual;

generating a plurality of two-dimensional (2D) cell regions, each associated with a new node, from traversing said 2D dual;

connecting said new nodes to form quadrilateral elements which form a modified surface mesh; and displaying said surface mesh on a computer screen.

28. A mesh modifier for editing a portion of a surface mesh, comprising:

a controller for performing the steps of:

selecting a portion of a surface mesh for editing, where the mesh includes a plurality of dimensional (2D) faces each having four edges and at least four predetermined nodes;

generating a two-dimensional (2D) dual of the portion of the surface mesh;

editing the 2D dual;

generating a plurality of two-dimensional (2D) cell regions each associated with a new node, from traversing said 2D dual;

connecting said new nodes to form quadrilateral elements which form a modified surface mesh; and displaying said surface mesh on a computer screen.

29. A method, practiced on a computer, for modifying a surface mesh, comprising:

connecting a plurality of rows of faces of a surface mesh using connecting lines to form a 2D dual of the surface mesh;

modifying connecting lines within said 2D dual by adding new connecting lines or deleting existing connecting lines leaving a plurality of remaining connecting lines, where said remaining connecting lines form a plurality of two-dimensional regions, each region bounded by connecting line segments that intersect;

associating each two-dimensional region with at least one node and connecting a plurality of rows of nodes to produce a modified form of said surface mesh; and displaying said modified form of said surface mesh on a computer screen.

* * * * *